Feb. 5, 1935. J. REDWINE 1,989,883
ARTIFICIAL FLOWER AND COMBINATION THEREWITH
Filed June 17, 1933
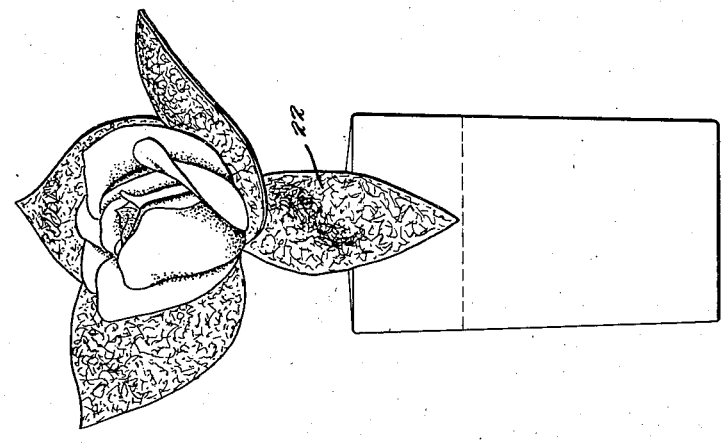
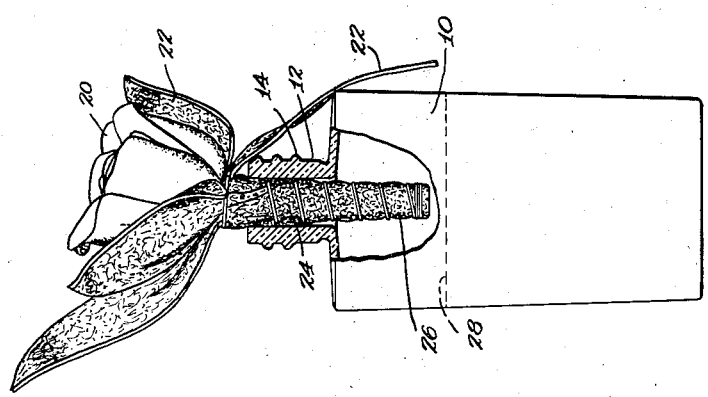
Inventor
Jesse Redwine
by Everett Kent
attorney Patented Feb. 5, 1935

1,989,883

UNITED STATES PATENT OFFICE 1,989,883

ARTIFICIAL FLOWER AND COMBINATION THEREWITH

Jesse Redwine, Massillon, Ohio

Application June 17, 1933, Serial No. 676,295

2 Claims. (Cl. 299—20)

This invention relates to improvements in artificial flowers and combinations therewith.

More especially it provides an artificial flower having the particular characteristic that it disseminates odor or, if it be desired, supplies to the atmosphere a vapor having deodorant, disinfectant or some other useful quality. The device may have bloom and foliage to represent any among numerous varieties of natural flowers. Its odor may be that which is characteristic of the particular type of flower which is portrayed by the artificial construction; but as the invention can distribute the vapor of any volatile liquid it also has utility in the different but very practical fields of distributing a volatile deodorant or disinfectant substance; and in some cases of attracting and poisoning objectionable insects; and of accomplishing these useful but homely purposes in a manner which is æsthetically pleasing.

The invention may be embodied, for example, in an artificial rose, standing gracefully in its vase; appearing merely as a thing of beauty, but actually engaged in distributing a deodorant or a disinfectant through the apartment.

The invention also provides means, by combination with a container of particular construction, for controlling the rate of distribution, to make the distribution rapid and continuous; or to make it intermittent under human control. This latter effect is gained by providing for an inherent tendency toward cessation of discharge; coupled with means by which it may be re-set by an attendant, which is done by an operation of utmost simplicity.

The invention is also characterized by the other advantages which inhere in the construction herein disclosed; and it is intended that the patent shall cover, by suitable expression in the appended claims, wherever features of patentable novelty exist in the invention disclosed.

For illustrating the invention a representation of the blossom, stem and foliage of an ordinary flower set in a simple container may typify any of many varieties, both of flower and of container.

In the accompanying drawing:

Figure 1 is a front elevation of a flower and container embodying the invention;

Figure 2 is a side elevation of the same, but is broken away to a medial-vertical section at the top of the container, thus showing the relation between foliage and that portion of the artificial flower which, in the position of a stem, constitutes combinedly a stopper and a capillary supply to the distributing part of the flower; and Figure 3 represents a cap for tight closing of the container when the flower is removed thence.

Referring to the drawing, the container is represented as being a simple bottle whose body 10, which may be of any desired size or shape, is here represented as approaching cylindricity in shape; but whose neck 12 is small, and is made with a diametric dimension having relation to the stem of the flower, as described below, rather than with artistic relation to the size or shape of the body of the bottle. This bottle may be of glass, and its neck may conveniently have threads 14 molded externally so that it can receive a cup shaped cap 15 having interior threads of usual type to permit of the tight closing and the ready opening of the top of the bottle by means of this screw cap.

The bloom 20 of the flower may be made in any desired way, of any material suitable for constructing the particular flower which it is desired to represent; and the blossoms represented may be as few or as numerous as may be desired.

In the instance which is being described the flower may be assumed to be a rose, whose blossom is made of paper, of the "wax" variety, or otherwise to have realistic appearance. The foliage 22 consists of fibrous sheet material having marked capillary power, for which strips of ordinary green felt serve excellently, in the case of a rose. These strips of felt extend upward and outward from the bottle neck, in suitable shape and design to constitute the representation of foliage; and they extend inward at 24 as a stem through the neck 12 and depend at 26 a short distance below the neck into the body of the bottle or other container, looking like a stem. But this stem may be, and preferably is, as large as the neck. Therefore the hole through the bottle neck is made small, so that, combinedly, the wad of strips of felt at 24 will fill the neck of the bottle to such degree of tightness as may be desired, to constitute a stopper, while also constituting a stem for the artificial flower. This stem 24 is integrally a continuation of the material of the leaves 22, and while being so large that it constitutes a stopper for the bottle, filling the neck of the container, yet is sufficiently loose, as regards its own internal interfibrous spaces, that liquid reaching it from within the container can rise capillarily through it, and can flow capillarily from it into the several leaves 22, whence this liquid becomes distributed into the atmosphere by evaporation.

Depending upon the variety of liquid 28 which is placed in the container, by selection according to the purpose desired, the leaves then emanate a fragrance which is appropriate for the flower represented, or is a deodorant, or a disinfectant, or is any other fragrant or useful substance which is to be disseminated through the atmosphere by evaporation from the felt. Or the liquid which is thus absorbed in them, making them wet, may be any suitably attractive insecticide.

When liquid within the container touches the felt stem which depends from the neck into the body of the bottle, that liquid enters the body of the felt and rises by capillary attraction through the spaces between its fibres, in the neck of the bottle, and passes on throughout the body of felted material which constitutes the representation of leaves. These leaves may be large enough in area so that evaporation from them proceeds at a pace which will prevent the excessive accumulation, with coalescing and dripping of the liquid from depending parts of the foliage. By making the felt material in the stem to have a denser body so that it is packed together more tightly in the neck of the bottle, the rate of outflow may be predetermined to be slower. To prepare and hold in linear stem form this condensation 24 of felt for the neck, that part of the felt which is to constitute the stem may be wound tightly with thread or with wire, so as to hold it down to such a size as makes it insertible in the neck. Nevertheless it is preferred that the stem shall be so large as to fill the neck 14 completely, so that the whole may be inverted without the liquid running out.

By the terminating of the depending stem 26 at a distance above the level of liquid 28 within the container, a manual control of the output is attained. A manual inverting or tipping of the bottle, so as to submerge in liquid that part 26 of the felt stem which projects into the body of the bottle, will cause that portion of the felt to absorb liquid, some of which will proceed immediately by capillary attraction to the outside portions of the felt and will be there disseminated. Other of it, remaining in the capillary spaces will proceed gradually to the evaporating surface; and the discharge into atmosphere will continue for a long time. While the action and its duration may vary with different liquids, it is found by experience that a single tipping is sufficient to charge the felt with this effect. Yet when the need is past, the apparatus automatically becomes substantially undistributive, upon the evaporation of the latest charge supplied to the stem. This results from the mere leaving of the apparatus to stand still, and from the structural non-contact of stem with liquid. And when left standing thus, the dense filling of the neck by the stem of compressed felt is sufficient to prevent the escape of odor from the contents except at an extremely slow rate, whose slowness depends upon the tightness with which the felt is compressed as a stopper, within the neck. When need again arises it may be put into action by simple tipping above described, with immediate restoration to position standing on its base as illustrated. On the other hand, if long continued output is wanted an extension felt strip (not shown) may be pinned or otherwise secured to the interior part 26, long enough to reach to the bottom of the container. The feeding and evaporation will then continue until the contents of the bottle are exhausted.

The felt used for making the leaves and the stem may be of any ordinary variety, such, for example, as the green felt used commonly for covering a billiard table; and it may be shaped or trimmed, or decorated by lines marked on it, as may suit the artistic taste of the maker. A substance other than felt may be used in place of felt, providing that it has the requisite capillary capacity to constitute the elevating, distributing and evaporating agency, and has the requisite aspect to permit of its being given the appearance of leaves. The delicate color and texture requisite for the representation of a blossom is, in most cases, best made from material which is not of a capillary nature; and the foliage is preferably represented by the capillary material; but the invention is not necessarily restricted to this arrangement.

It will be observed that in the structure illustrated the area of foliage exposed to contacts with the atmosphere is much greater than the area of cross section for capillary travel of liquid out through the neck of the container. The liquid which is drawn up by capillarity through to the foliage must remain there until it either evaporates or coalesces and drips from some depending parts of the foliage. Considering the slowness of the rate at which evaporation may happen to occur, and the fact that this rate may vary from time to time with atmospheric conditions, or may vary with difference of liquid used, this excess of area which is available for capillary distribution through the foliage provides an automatically acting situation which keeps the liquid in the foliage neatly, without dripping. If evaporation is slow the liquid spreads capillarily through a larger area of the available leaf sheet material. The rate of evaporation for the apparatus as a whole increases with the area of liquid thus exposed to atmosphere, and finally this area becomes extended enough to equal the rate at which fresh liquid is supplied by capillarily rising through the neck. Thus by reason of the large excess of area the apparatus accommodates itself both to kind of liquid and to atmospheric conditions, as much or as little of said excess being used as circumstances require.

I claim as my invention:

1. A device for distributing a volatile liquid by capillary action, and controlling the said distribution comprising, a closed container for the liquid, having a top outlet filled with capillary material, and a distributive exterior larger area of capillary material connected therewith and exposed to atmosphere; the said outlet capillary material being a linear mass entering the container a short distance, and terminating a considerable distance from the bottom of the container, whereby a level of liquid in the container may be spaced from the lower end of said linear mass; said linear mass being of resiliently compressible nature, and having a tapering portion for frictionally engaging the walls of the said outlet of the container as a stopper, thereby to provide for varying the density of said linear mass at said outlet, for controlling capillary flow of liquid to the said exterior larger area of capillary material after the container is momentarily inverted, for charging said linear mass.

2. In a new article of manufacture, a mass of capillary material having an exterior distributive evaporative portion and a tapering, compressible, porous stem portion for engaging in the mouth of a container of liquid, and for capillarily transmitting liquid to the said distributive portion for evaporation; said tapering portion of stem providing for control of rate of capillary transit of liquid to said evaporation surface, by adjustment of said tapering portion in the mouth of the container, thereby to vary the density of the stem and the side of capillary passages at said portion.

JESSE REDWINE.